(12) United States Patent
Hackman

(10) Patent No.: US 7,520,698 B2
(45) Date of Patent: Apr. 21, 2009

(54) CUTTING TOOL FOR GEARS AND OTHER TOOTHED ARTICLES

(75) Inventor: Roger L. Hackman, Winnebago, IL (US)

(73) Assignee: Gleason Cutting Tools Corporation, Loves Park, IL (US)

(*) Notice: Subject to any disclaimer, the term of this patent is extended or adjusted under 35 U.S.C. 154(b) by 96 days.

(21) Appl. No.: 11/294,222

(22) Filed: Dec. 5, 2005

(65) Prior Publication Data

US 2006/0133901 A1   Jun. 22, 2006

Related U.S. Application Data

(60) Provisional application No. 60/637,964, filed on Dec. 20, 2004.

(51) Int. Cl.
*B23F 21/16* (2006.01)
*B23F 21/12* (2006.01)

(52) U.S. Cl. .................. 407/29; 407/25; 409/25

(58) Field of Classification Search ............ 407/20–23, 407/25, 27, 29; 409/25, 38
See application file for complete search history.

(56) References Cited

U.S. PATENT DOCUMENTS

| | | | | |
|---|---|---|---|---|
| 624,156 A * | 5/1899 | Balcom | ............. | 408/222 |
| 688,098 A * | 12/1901 | Knappe | ............. | 407/25 |
| 2,567,167 A * | 9/1951 | Drader | ............. | 407/25 |
| 2,575,239 A * | 11/1951 | Stephens | ............. | 175/383 |
| 2,811,054 A * | 10/1957 | Townsend | ............. | 408/201 |
| 3,036,363 A | 5/1962 | Novkov | | |
| 3,303,556 A | 2/1967 | Pinkowski | | |
| 3,688,368 A * | 9/1972 | Bodem | ............. | 407/25 |
| 3,859,700 A | 1/1975 | Jilbert | | |
| 4,116,579 A * | 9/1978 | Hamilton | ............. | 408/233 |
| 4,205,932 A * | 6/1980 | Tennutti | ............. | 407/25 |
| 4,278,370 A * | 7/1981 | Spear | ............. | 407/115 |
| 4,322,185 A * | 3/1982 | Tanimoto et al. | ............. | 407/23 |
| 4,621,954 A * | 11/1986 | Kitchen et al. | ............. | 407/22 |
| 4,642,001 A * | 2/1987 | Gill et al. | ............. | 408/59 |
| 5,031,491 A * | 7/1991 | Hofmann | ............. | 82/158 |
| 5,205,678 A * | 4/1993 | Britsch et al. | ............. | 407/6 |
| 5,232,316 A * | 8/1993 | Tennutti | ............. | 407/23 |
| 5,733,078 A * | 3/1998 | Matsushita et al. | ............. | 409/74 |
| 5,890,852 A * | 4/1999 | Gress | ............. | 408/221 |
| 6,042,308 A * | 3/2000 | Schmitt | ............. | 407/24 |
| 6,120,217 A * | 9/2000 | Stadtfeld et al. | ............. | 407/21 |
| 7,059,810 B2 * | 6/2006 | Francis et al. | ............. | 407/23 |

OTHER PUBLICATIONS

Gleason company brochure "Cutting Tools for Cylindrical Gears" May 2004, 4 pages.

* cited by examiner

*Primary Examiner*—Boyer D Ashley
*Assistant Examiner*—Sara Addisu
(74) *Attorney, Agent, or Firm*—Robert L. McDowell

(57) ABSTRACT

A cutting tool having a two-sided cutting blade positionable in a tool holder to form a blade hob. The inventive cutting tool can be used to duplicate the generation action of single or multi-threaded, multi-gashed hobs. The two-sided cutting blade includes one or more tooth profile shaped cutting teeth located at each end of a cutting blade body. The cutting teeth on respective ends are axially offset from one another. The cutting blade is moved to a number of generating positions to generate the desired tooth surface on a workpiece.

11 Claims, 9 Drawing Sheets

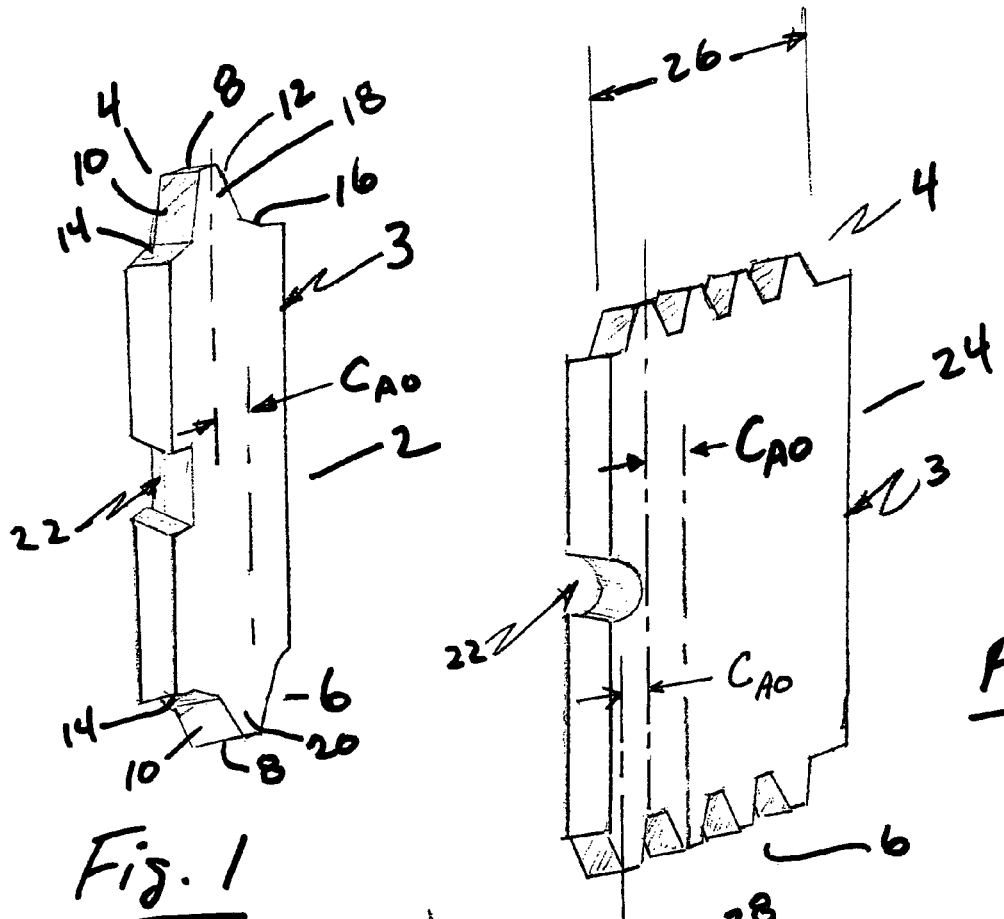
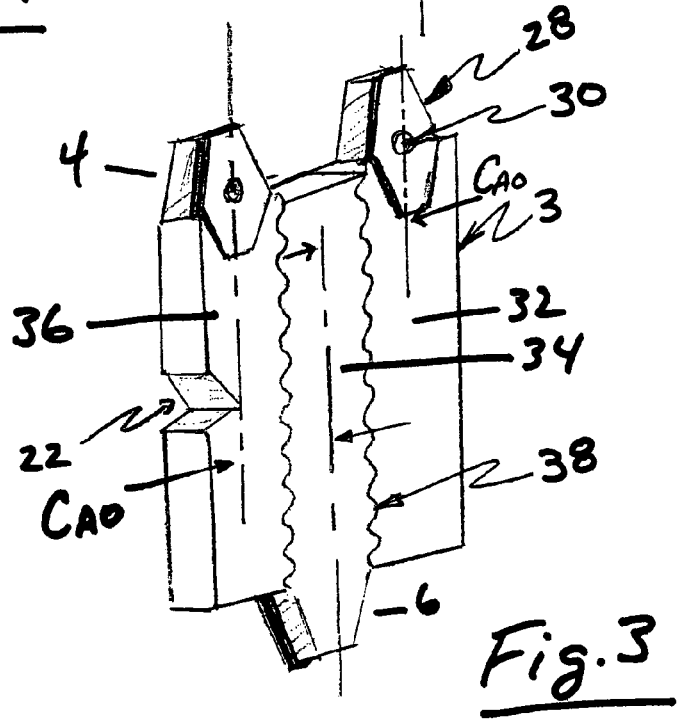
Fig. 1
Fig. 2
Fig. 3

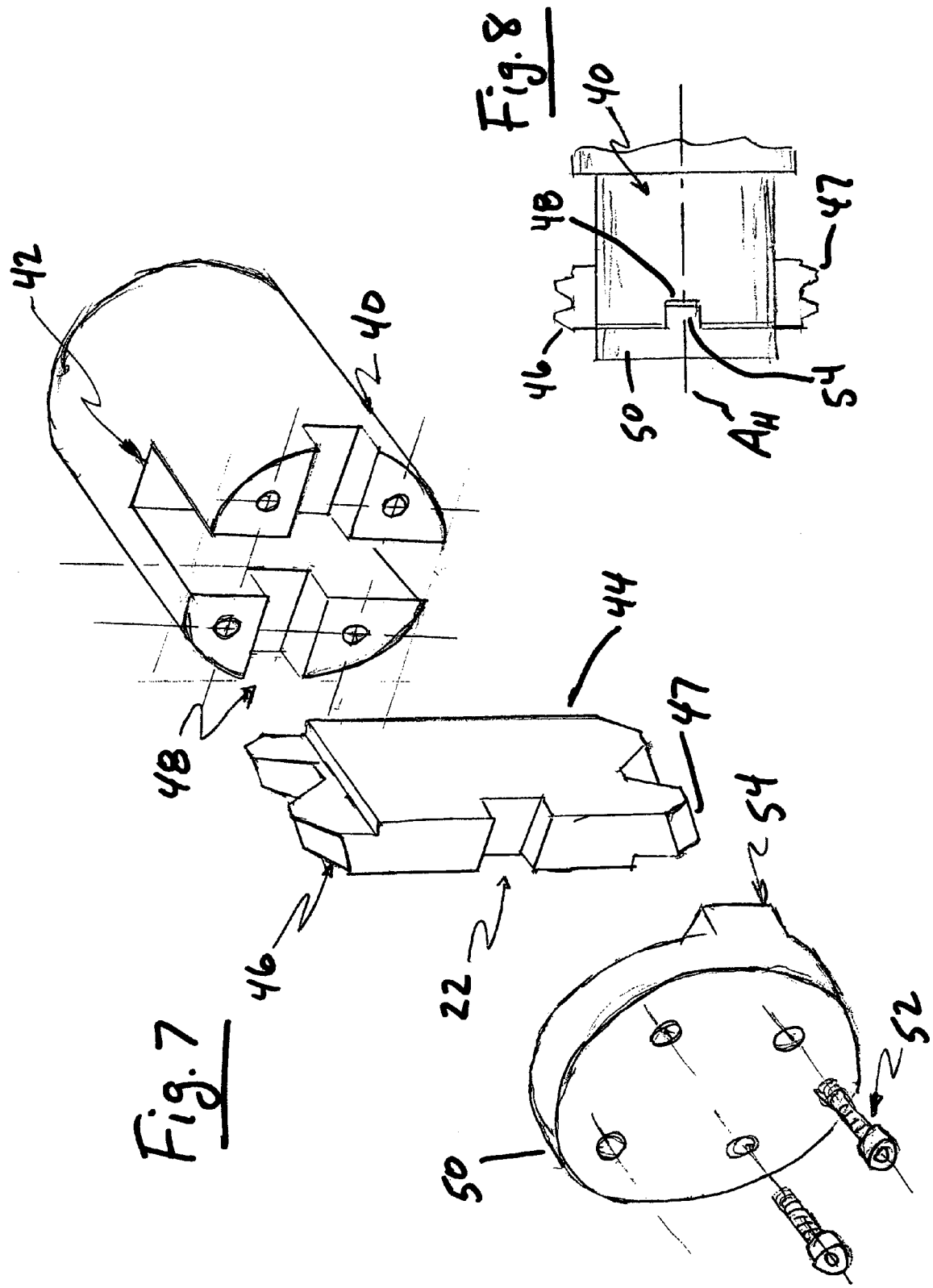

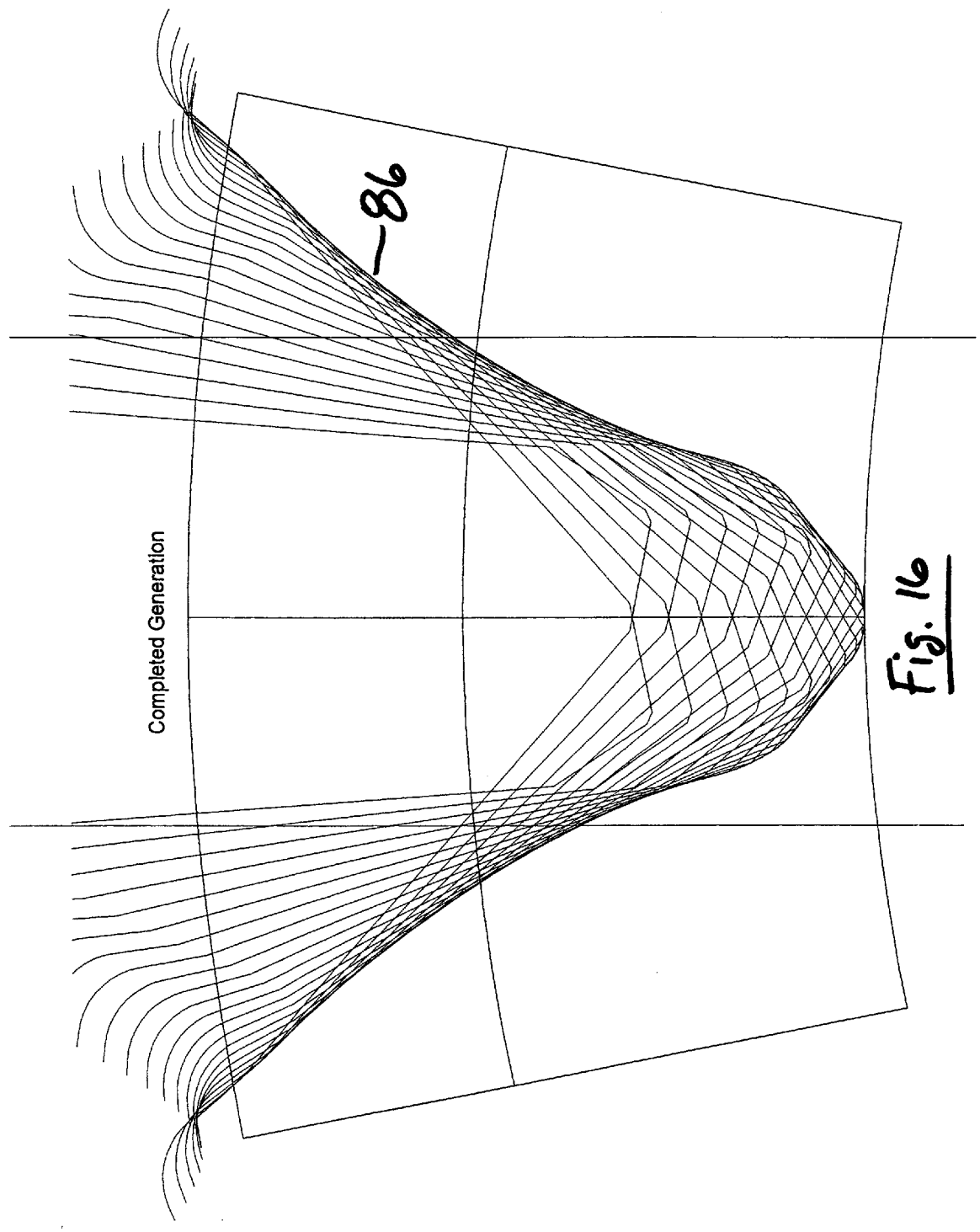

CUTTING TOOL FOR GEARS AND OTHER TOOTHED ARTICLES

This application claims the benefit of U.S. Provisional Patent Application No. 60/637,964 filed Dec. 20, 2004.

FIELD OF THE INVENTION

The present invention is directed to a cutting tool having a two-sided cutting blade for the production of gears and/or other toothed articles.

BACKGROUND OF THE INVENTION

In the production of toothed articles, particularly gears such as spur and helical gears, it is widely known to utilize a hob comprising a single thread or multiple threads spirally arranged about the circumference of the hob. Each thread includes multiple gashes to form a plurality of cutting teeth along the length of the spirally arranged thread. Hobs of this type are shown, for example, in the Gleason company brochure "Cutting Tools for Cylindrical Gears", May, 2004.

In many instances, such as low quantity production runs or job shop environments, the cost of a conventional hob may not be justified. While cutting tools have been disclosed (for example by Novkov in U.S. Pat. No. 3,036,363; Pinkowski in U.S. Pat. No. 3,303,556; or, Jilbert in U.S. Pat. No. 3,859,700) which include one or more cutting blades inserted in a cutter head, such inserted-blade cutting tools are for face milling applications and are unsuitable for hob-type generation of tooth profiles necessary for cutting gears.

SUMMARY OF THE INVENTION

The cutting tool of the present invention comprises a two-sided cutting blade positionable in a tool holder to form a blade hob. The inventive cutting tool can be used to duplicate the generation action of single or multi-threaded, multi-gashed hobs. The two-sided cutting blade comprises one or more tooth profile shaped cutting teeth located at each end of a cutting blade body. The cutting teeth on respective ends are axially offset from one another. The cutting blade is moved to a number of generating positions to generate the desired tooth surface on a workpiece.

BRIEF DESCRIPTION OF THE DRAWINGS

FIG. 1 illustrates a first cutting blade embodiment of the present invention having a single tooth-shaped cutting profile at each end of the cutting blade.

FIG. 2 illustrates another cutting blade embodiment of the present invention having a plurality of tooth-shaped cutting profiles at each end of the cutting blade.

FIG. 3 shows cutting blade profiles comprising inserts and the blade body itself comprising a plurality of blade segments.

FIG. 7 shows the components which comprise the inventive blade hob.

FIG. 8 illustrates a side view of an assembled blade hob.

FIG. 16 exemplifies all cutting passes to completely generate a tooth slot.

DETAILED DESCRIPTION OF THE PREFERRED EMBODIMENT

Figure 4A:
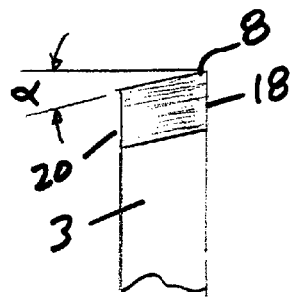
FIGS. 4A, 4B and 4C illustrate several surfaces on the cutting end of a cutting blade.

The present invention will now be discussed with reference to preferred embodiments and the drawing figures which represent the invention by way of example only.

The cutting tool of the present invention comprises a two-sided cutting blade whereby the inventive cutting tool can be used to duplicate the generation action of single or multi-threaded, multi-gashed hobs. FIG. 1 illustrates a first embodiment comprising a cutting blade 2 having a blade body 3 and toothed profile shaped cutting ends 4, 6 at opposite ends of the blade body with each cutting end having respective tip surface 8, side surfaces 10, 12, shoulder surfaces 14, 16, front face 18 and back surface 20. Cutting ends 4, 6 are axially offset by an amount $C_{AO}$ and the cutting blade 2 preferably includes a locater slot 22 of a desired shape (e.g. square, rectangular, arcuate, V-shaped) to locate and center the cutting blade in a tool holder as will be discussed below. It is understood and can be seen in FIG. 1 that the front face 18 of cutting end 4 faces one side of the cutting blade 2 while the front face of cutting end 6 faces the other side of the cutting blade 2.

FIG. 2 shows another embodiment 24 of the inventive cutting blade comprising a plurality 26 of toothed profile shaped cutting ends 4, 6 arranged at the ends of blade body 3. Each of the plurality of cutting ends 4, 6 include surfaces such as described above with respect to FIG. 1 and each of the plurality of cutting ends 4, 6 are axially offset from one another by an amount $C_{AO}$. FIG. 3 illustrates another embodiment wherein ends 4, 6 include removable cutting inserts 28 secured to the respective ends by suitable fasteners 30. FIG. 3 also illustrates another preferred feature of the present invention wherein the blade body 3 may comprise a plurality of blade body segments (e.g. 32, 34, 36 in FIG. 3) fastened together, preferably in an interlocking manner as shown at 38, for example. Preferably, each blade segment will include a cutting end thus the number of blade segments will usually correspond to the number of cutting ends on the cutting blade. For example, if blade segments were utilized in the cutting blade of FIG. 2, the cutting blade would comprise eight blade segments.

Figures 4B, 4C:
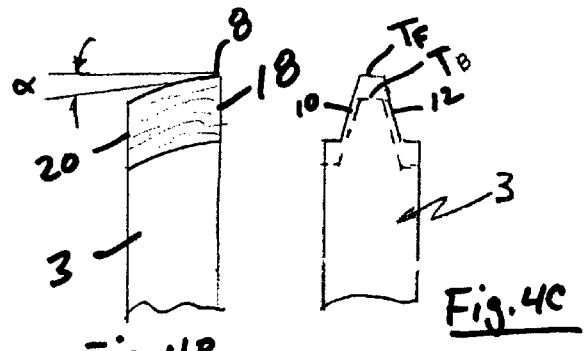

As stated above, the cutting ends 4, 6 of a cutting blade may include several surfaces (e.g. 8, 10, 12,14,16, 18, 20) and these surfaces may be manufactured at particular orientations suitable for producing a desired surface on a gear or other toothed article as is understood by the skilled artisan. For example, cutting blade side view FIG. 4A shows tip surface 8 relieved in a straight manner from front face 18 to back surface 20 by a tip relief angle α while side view FIG. 4B shows tip surface 8 relieved in a non-linear manner from front face 18 to back surface 20 by a tip relief angle α. The tip relief of FIGS. 4A and 4B is also illustrated in cutting blade front view FIG. 4C where the position of the blade tip at the back surface, $T_B$, is shown at a different position (a lower position in this view) than the position of the blade tip at the front face, $T_F$.

Figure 5A:
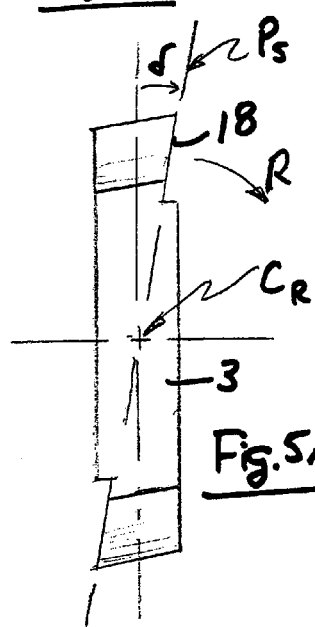
FIGS. 5A, 5B and 5C exemplify different hook angle orientations of the front face on the cutting end of a cutting blade.
Figure 5B:
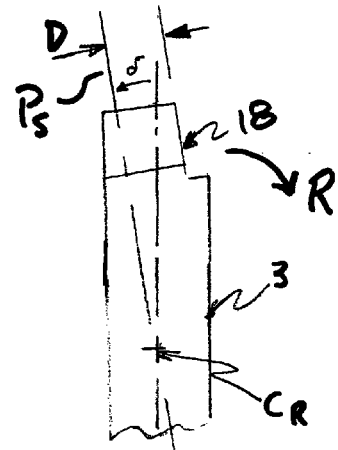
Figure 5C:
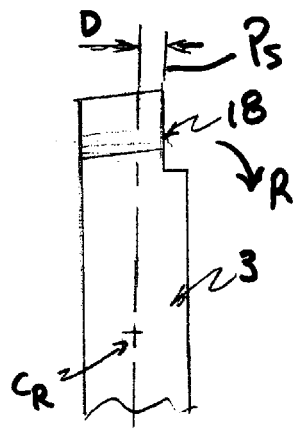
Figure 6:
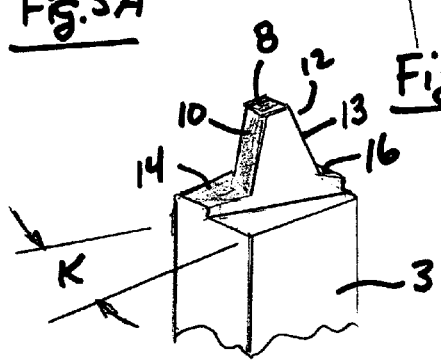
FIG. 6 illustrates the rake angle of the front face on the cutting end of a cutting blade.

The angle of the front face 18 with respect to the lengthwise direction of the blade body (i.e. hook angle δ) may also be modified. FIG. 5A shows a sharpening plane $P_S$ passing through the cutter blade center of rotation, $C_R$, and oriented to provide a front face 18 angle that is positive (i.e. a positive hook angle δ) in the sense of cutter rotation R. An opposite effect is shown in FIG. 5B wherein the sharpening plane $P_S$ passes through the cutter blade center of rotation, $C_R$, at an orientation to provide an angle of the front face 18 that is negative (i.e. a negative hook angle δ) in the sense of cutter rotation R. Of course, unlike FIG. 5A where the sharpening plane $P_S$ defines the front face 18 of the cutting blade, the sharpening plane $P_S$ in FIG. 5B, while defining the orientation of the front face 18, lies at an offset sharpening distance, D, from the front face 18. In FIG. 5C, the sharpening plane $P_S$ is parallel to the direction of the blade body (although offset by distance D from the lengthwise centerline) thereby resulting in a zero hook angle being formed. The front face 18 may also be oriented at a desired rake angle, K, as is illustrated in FIG. 6.

As mentioned above, a cutting blade preferably includes a locater slot 22 (FIGS. 1-3) of a desired shape (e.g. square, rectangular, arcuate, V-shaped) to locate and center the cutting blade in a tool holder or body 40 such as shown in FIG. 7 to form a tool hereafter referred to as a blade hob. The tool holder 40 can be mounted in a machine spindle via a shank of any form such as a straight, tapered or stepped design (e.g. KM63, CAPTO, CAT No. 40). The end of tool holder 40 includes a sliding fit receiving slot 42 for receiving a cutting blade 44 having, for example, relieved cutting tooth profiles 46, 47. Tool holder 40 also preferably includes a locater slot 48 preferably oriented generally perpendicular to receiving slot 42. When cutting blade 44 is positioned in tool holder 40, locater slot 22 of the cutting blade and locater slot 48 align to preferably form a continuous locater slot across the tool holder 40. Of course, it is preferable that locater slots 22 and 48 are of the same shape, e.g. square.

Once cutting blade 44 is inserted into position in the tool holder 40, a clamping cover 50 is attached to the end of tool holder 40 via fasteners 52 (e.g. screws) to secure the cutting blade 44 in position (see FIG. 8). Clamping cover 50 includes a locater key 54 of a shape corresponding to locater slots 22 and 48. Upon attachment of clamping cover 50, locater key 54 is inserted into locater slots 22, 48 which locates and centers the cutting blade 44 in the tool holder 40 so that the cutting blade 44 may accurately rotate about the axis, $A_H$, of the as-formed blade hob. The tool holder 40 may be manually exchanged or automatically exchanged via device such as a robotic device.

The inventive blade hob may be utilized in wet or dry cutting applications and the cutting blade can by made of conventional or powered metal hardened high speed steel (HSS) of any alloy composition (such as, for example, M2, M4, Rex 45, Rex 54, Rex 76, T15, Rex 121 or others) or made of carbide hard metal of any alloy composition, such as P and K grades. The cutting blade may also be made of conventional steel materials and machined with pockets to accept a removable and disposable cutting insert (e.g. FIG. 3) of HSS or carbide material. The surfaces of the cutting blade and cutting inserts may be coated and recoated with PVD single or multi-layer coatings consisting of any commercially available wear coating or combination of wear coatings such as, for example, TiN, TiCN, TiAlN, AlTiN, CrAlN, ZrN, CrN and others. The cutting blade may be used as a single use throw-away tool or may be used multiple times by having any coating stripped, resharpened to remove wear, and recoated if desired.

Figure 9:
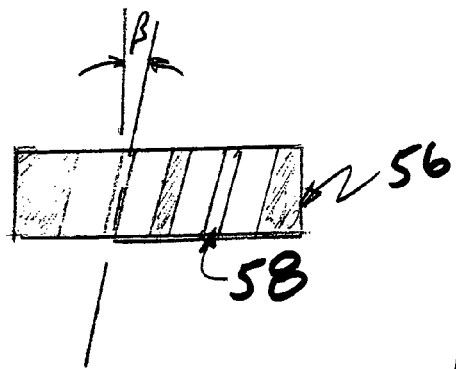
FIG. 9 illustrates the thread angle β of the teeth on the cutting end of a cutting blade.
Figure 10:
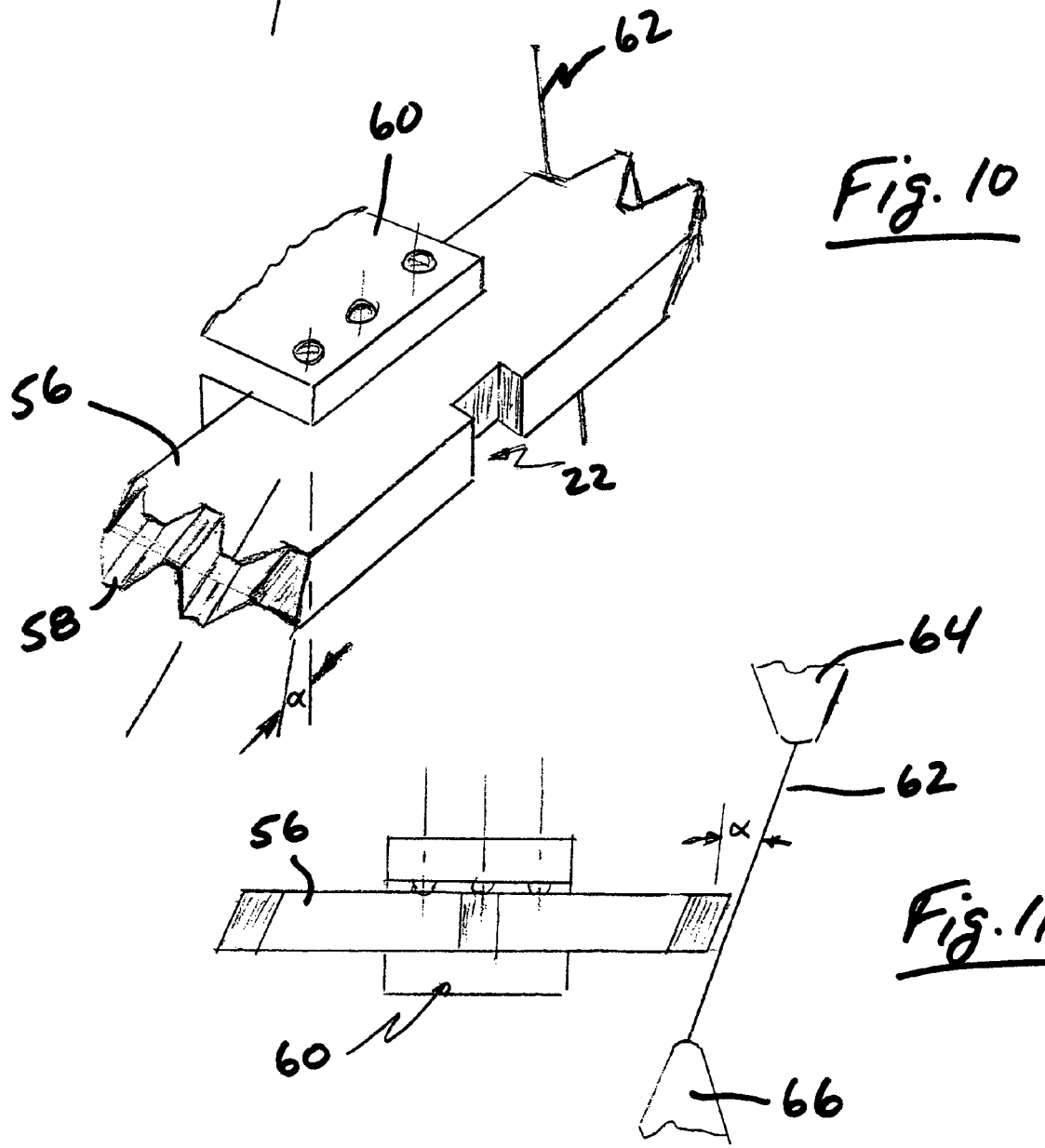
FIG. 10 show a cutting blade positioned in an EDM clamping block.
Figure 11:
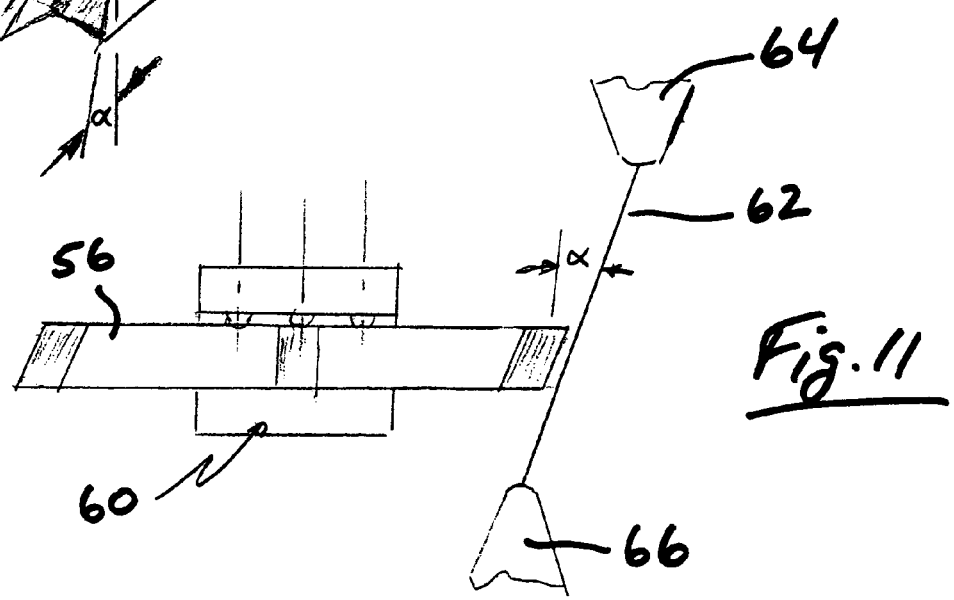
FIG. 11 shows an EDM wire oriented at a relief angle α for movement along a path appropriate to form the desired surfaces of a cutting blade.

The cutting blade may be formed by any suitable method. For example, a toothed profile with straight side, bottom and top relieved angles, along with the locater slot 22, could be Wire EDM cut, preferably in a single setup as shown in FIGS. 9-11. FIG. 9 shows a cutting blade 56 having opposed cutting ends with tooth tips 58 and thread angle β. FIGS. 10-11 show the cutting blade 56 positioned in an EDM clamping block 60 and an EDM wire 62, oriented at a relief angle α between wire EDM upper head 64 and wire EDM lower head 66, which is moved along a path appropriate to form the desired surfaces of the cutting blade 56. The clamped cutting blade 56 and the EDM wire 62 are moved relative to one another to form the tooth surfaces on the other end of the cutting blade 56. Upper and lower EDM heads may be repositioned and the clamped cutting blade 56 and the EDM wire 62 moved relative to one another such that locater slot 22 may be formed to the desired shape.

Figure 12:
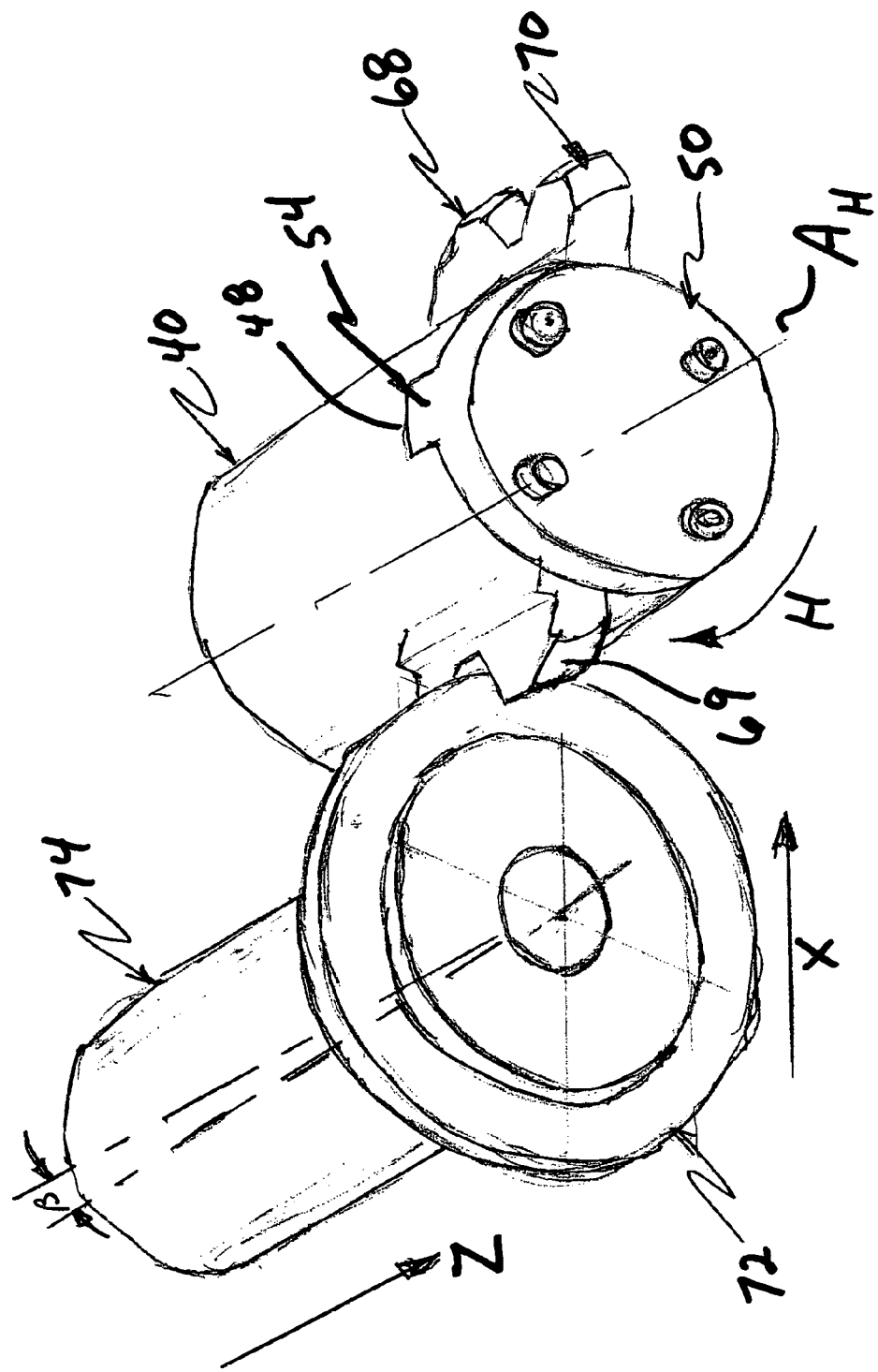
FIG. 12 illustrates a relieved profile surface formed on a cutting end by a grinding process.

Alternatively, a cutting blade with a cam (curved) relieved profile may be formed by a grinding process such as illustrated in FIG. 12. A cutting blade having opposed cutting ends 68, 69 is mounted to tool holder 40, as discussed above, via locater slot 48, locater key 54 and clamping cap 50. A cam relieved profile 70 is ground on the cutting ends 68, 69 utilizing a grinding wheel 72, for example, a full profile grinding wheel, mounted to a grinding spindle 74 with the grinding wheel being oriented at a desired thread lead angle β. The cam relieved profile 70 is formed by a combination of motions, namely a grinding wheel axial feed motion, Z, and a radial relieving motion, X, timed with the rotation, H, of the tool holder 40 and cutting blade.

Figure 13:
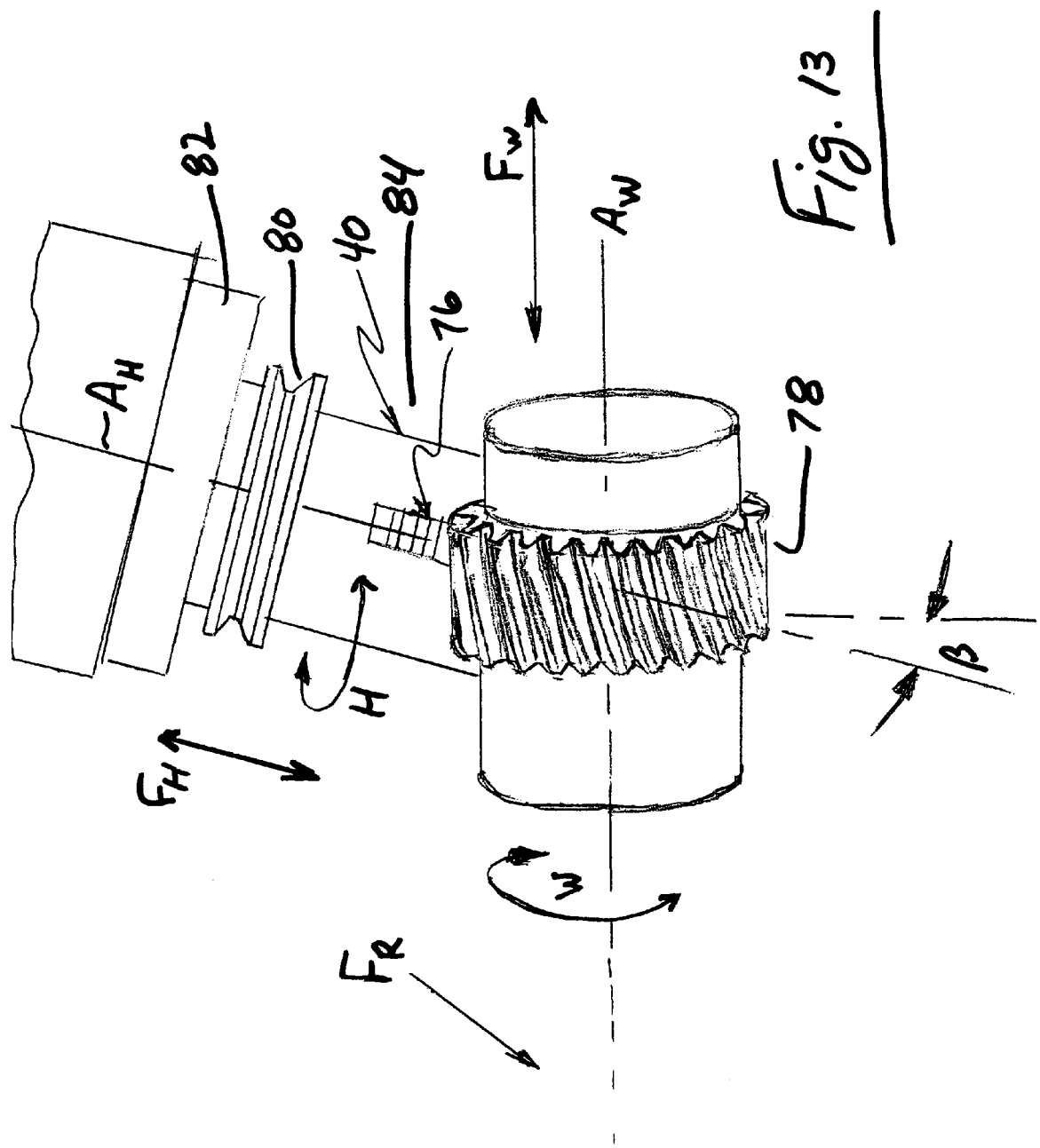
FIG. 13 shows the relationship between the inventive blade hob and a workpiece.

FIG. 13 shows the relationship between a cutting blade 76 (in tool holder 40, collectively the blade hob 84), and a workpiece 78. Tool holder 40 is mounted on shank 80 which in turn is mounted in a tool drive spindle 82 of a machine such that cutting blade 76 is rotatable about tool (blade hob) axis $A_H$. In order to duplicate the generation action of a single or multi-thread, multi-gashed hob, the cutting blade 76 must be moved axially (direction $F_H$) to a number of generating positions after each pass (in direction $F_W$) through the workpiece 78 (e.g. a spur or helical gear of either constant or tapered diameter). The number of axial shifts along $F_H$ and the number of passes through the workpiece in direction $F_W$ will determine the number of generating flats produced on the workpiece tooth surfaces.

Figure 14:
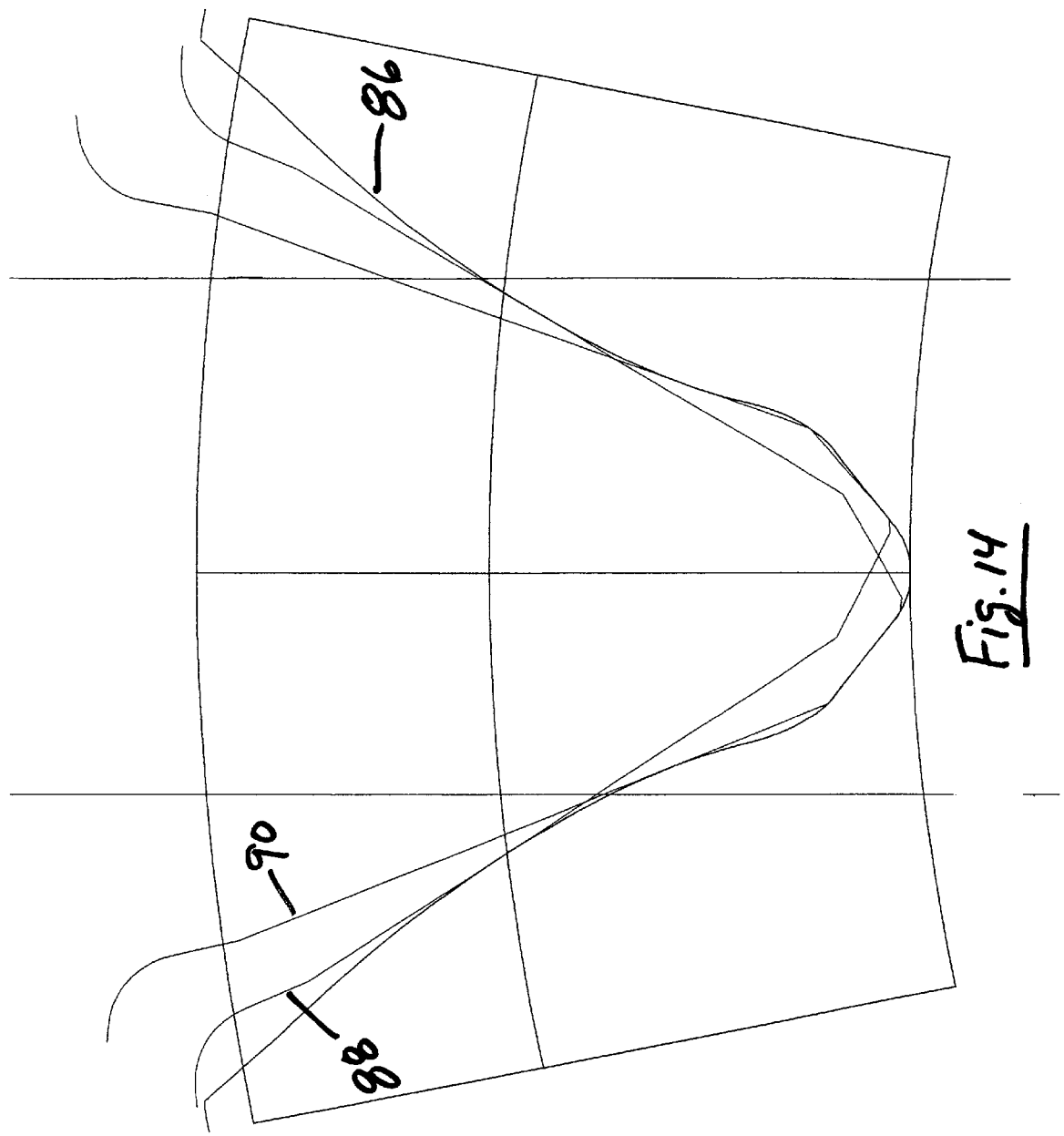
FIG. 14 illustrates the first pass of opposed cutting blade ends to cut a tooth slot.
Figure 15:
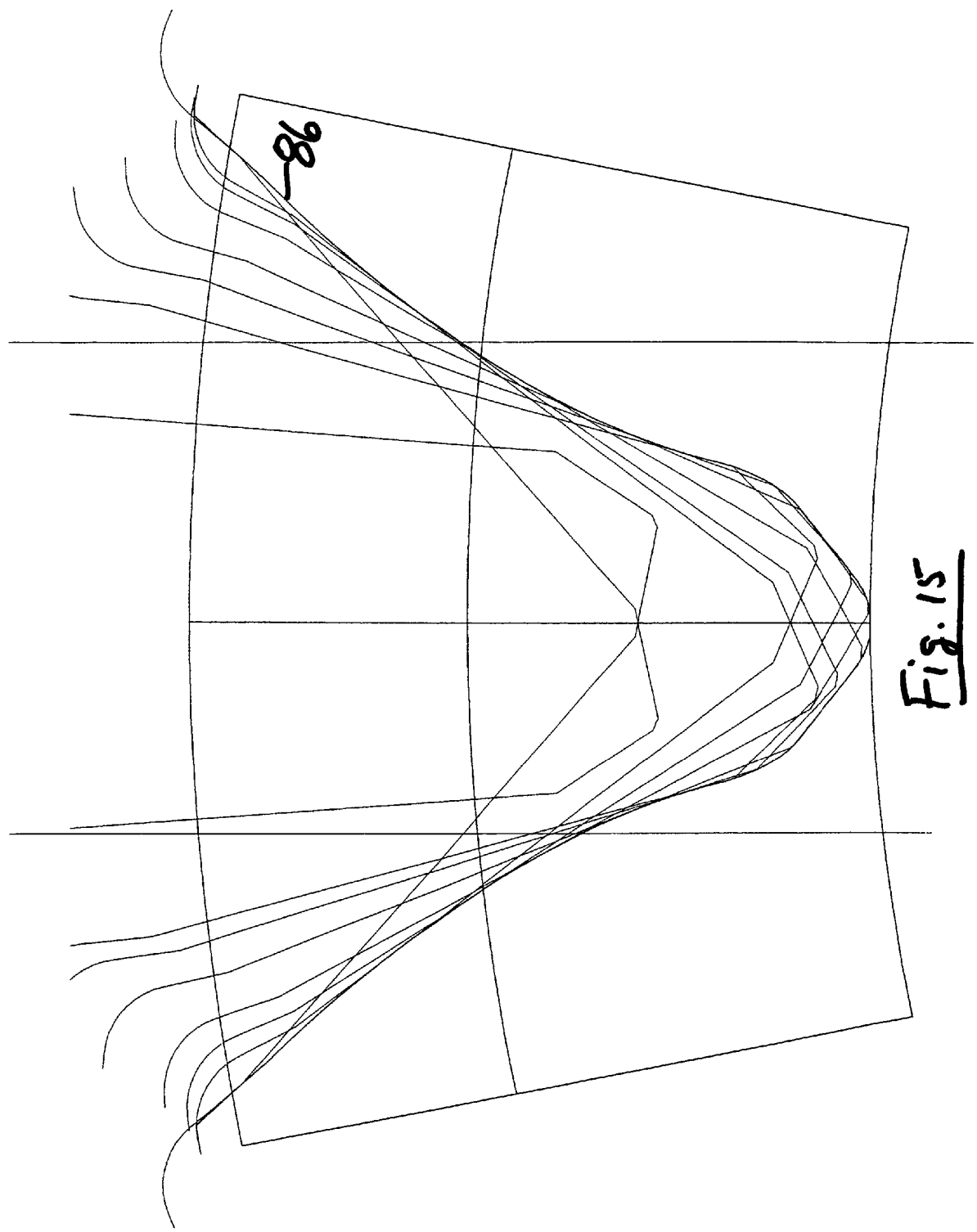
FIG. 15 illustrates several multi-shift passes of the cutting blade ends through a tooth slot.

FIG. 14 shows the first pass 88, 90 of cutting blade profiles (e.g. formed by cutting ends 68, 69 of FIG. 12) to cut a tooth slot 86 (i.e. to form opposing tooth surfaces of adjacent teeth) in a workpiece. The different positions are due to the axial offset, $C_{AO}$, (FIG. 3 for example) of the cutting profiles at each end of the cutting blade. FIG. 15 shows several multi-shift passes of the cutting blade through the tooth slot 86. FIG. 16 shows the complete generated tooth slot 86.

The starting point can be at either end or in the middle of the generating zone (the outline of tooth slot 86 can be thought of as the generating zone). In most instances, for optimum stock removal and cutting blade chip load sharing, the center position of the generating zone may be preferred as a starting position to remove the majority of the workpiece material followed by an alternating shift sideways (±shift in direction $F_H$, FIG. 13) to generate the final desired workpiece tooth surface profile. The skilled artisan will understand the machine computer control (e.g. CNC) may be programmed based on the particular process parameters and conditions (e.g. wet or dry machining, workpiece and/or tool material, cutting tool speeds and feed rates, desired workpiece tooth geometry, number of passes, amount of shift, etc.).

Although the present invention preferably comprises a two-sided cutting blade positioned in a tool holder, the inventive concept is not limited to the assembly of such components but may comprise a solid cutting tool having diametrically opposed cutting edges (arranged 180 degrees apart such as shown in FIG. 8, but with the cutter being a solid unit). Furthermore, although preferred, it is not necessary that the cutting ends (e.g. 4, 6 in FIG. 1) be diametrically opposed. The cutting ends can be spaced with respect to one another at any given position as long as the appropriate axial offset distance is provided.

With the inventive blade hob having the two-sided cutting blade with axial offset, the generation action of a single or multi-threaded, multi-gashed hob can be duplicated. The blade hob is well suited, for example, for low production applications where the expense of a conventional hob may not be justified. The blade hob is also readily adaptable to machines with tool changers.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A cutting tool for producing gears and other toothed articles comprising:
    a tool holder having an axis of rotation, an innermost end mountable to a machine spindle and an outermost end;
    a two-sided cutting blade positioned in said outermost end of said tool holder, said cutting blade having a blade body, a first cutting end and a second cutting end with each cutting end having one or more toothed-shaped cutting profiles, the one or more toothed-shaped cutting profiles on said first end being spaced by an axial offset amount from the one or more toothed-shaped cutting profiles on said second cutting end, said two-sided cutting blade further comprising a locator slot having a predetermined shape,
    wherein said tool holder includes an outer surface with said first cutting end and said second cutting end projecting outwardly from said outer surface, said tool holder including a locator slot in said outermost end, said cutting blade being positioned in the tool holder whereby the locator slot of said cutting blade and the locator slot of the tool holder form a continuous locator slot in said outermost end,
    said cutting tool further comprising a clamping cover releasably secured to and covering said outermost end of the tool holder, said clamping cover having a locator key positioned in said continuous locator slot to secure the cutting blade in the tool holder.

2. The cutting tool of claim 1 wherein the first and second ends include removable cutting inserts.

3. The cutting tool of claim 1 wherein the two-sided cutting blade further comprises a plurality of blade body segments.

4. The cutting tool of claim 1 wherein at least a portion of said first and second cutting ends are coated with one or more wear coatings.

5. The cutting tool of claim 1 wherein the one or more tooth-shaped cutting profiles each comprise a tip surface, a pair of side surfaces, a front surface and a back surface.

6. The cutting tool of claim 5 wherein said tip surface is relieved from the front surface to the back surface in a straight or non-linear manner.

7. The cutting tool of claim 5 wherein the front face is oriented at a predetermined hook angle with respect to the lengthwise direction of the cutting blade.

8. The cutting tool of claim 5 wherein the front face is oriented at a predetermined rake angle K.

9. A cutting tool for producing gears and other toothed articles comprising:
    a generally cylindrical tool body having an axis of rotation, an innermost end mountable to a machine spindle, an outermost end and a cutting blade receiving slot located in said outermost end;
    one or more toothed-shaped cutting profiles projecting from said tool body at a first location and one or more toothed-shaped cutting profiles projecting from said tool body at another location, the one or more toothed-shaped cutting profiles at said first location being spaced by an axial offset amount from the one or more toothed-shaped cutting profiles at said another location,
    wherein the cutting profiles at said first location and the cutting profiles at said another location are located at respective first and second ends of at least one two-sided cutting blade wherein said cutting blade is positioned in said cutting blade receiving slot and held in said receiving slot by a clamping cover releasably secured to and covering said outermost end of said tool body.

10. The cutting tool of claim 9 wherein said first location and said another location are diametrically opposed on said tool body.

11. The cutting tool of claim 9 wherein the toothed-shaped cutting profiles projecting from said tool body at said first location and said one or more toothed-shaped cutting profiles projecting from said tool body at said another location are located on a cutting blade positioned in said tool body.

* * * * *